(12) United States Patent
Son

(10) Patent No.: US 8,913,877 B2
(45) Date of Patent: Dec. 16, 2014

(54) METHOD AND APPARATUS FOR OUTPUTTING STEREOSCOPIC IMAGES IN MOBILE TERMINAL

(75) Inventor: Kwang Sub Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 13/049,135

(22) Filed: Mar. 16, 2011

(65) Prior Publication Data

US 2011/0236000 A1 Sep. 29, 2011

(30) Foreign Application Priority Data

Mar. 24, 2010 (KR) ........................ 10-2010-0026350

(51) Int. Cl.
*H04N 5/76* (2006.01)
*H04N 5/783* (2006.01)
*H04N 13/00* (2006.01)
*H04N 19/597* (2014.01)

(52) U.S. Cl.
CPC .......... *H04N 5/783* (2013.01); *H04N 2213/007* (2013.01); *H04N 13/0055* (2013.01); *H04N 19/00769* (2013.01)
USPC ......................................... 386/278; 386/343

(58) Field of Classification Search
None
See application file for complete search history.

(56) References Cited

U.S. PATENT DOCUMENTS

| | | | |
|---|---|---|---|
| 6,704,029 B1 * | 3/2004 | Ikeda et al. | 715/723 |
| 2003/0184579 A1 * | 10/2003 | Zhang et al. | 345/723 |
| 2009/0225983 A1 * | 9/2009 | Reinoso et al. | 380/212 |
| 2010/0074594 A1 * | 3/2010 | Nakamura et al. | 386/92 |
| 2011/0149040 A1 * | 6/2011 | Klebanov et al. | 348/46 |
| 2011/0199456 A1 * | 8/2011 | Chao | 348/43 |

* cited by examiner

*Primary Examiner* — William C Vaughn, Jr.
*Assistant Examiner* — Eileen Adams
(74) *Attorney, Agent, or Firm* — Jefferson IP Law, LLP

(57) ABSTRACT

A method and an apparatus for outputting stereoscopic images in a mobile terminal are provided. The method includes entering a play control command for a stereoscopic video, searching for an I-frame (key frame) corresponding to a changed play position; determining, after decoding the found I-frame, whether the decoded I-frame is a left frame (L-frame) or a right frame (R-frame), adjusting, when the decoded I-frame is an R-frame, L-R sequencing, and outputting a stereoscopic image based on the adjusted L-R sequence. Hence, the mobile terminal may output a stereoscopic image in a manner that the stereoscopic effect intended by the content author is fully conveyed by the mobile terminal.

16 Claims, 4 Drawing Sheets

[a]

[b]

METHOD AND APPARATUS FOR
OUTPUTTING STEREOSCOPIC IMAGES IN
MOBILE TERMINAL

PRIORITY

This application claims the benefit under 35 U.S.C. §119(a) of a Korean patent application filed on Mar. 24, 2010 in the Korean Intellectual Property Office and assigned Serial No. 10-2010-0026350, the entire disclosure of which is hereby incorporated by reference.

BACKGROUND OF THE INVENTION

1. Field of the Invention

The present invention relates to a method and an apparatus for outputting stereoscopic images. More particularly, the present invention relates to a method and an apparatus for enabling a mobile terminal to output a stereoscopic image including alternating left frames and right frames.

2. Description of the Related Art

With rapid popularization, mobile terminals have become a necessity of modern life. Mobile terminals have evolved into multimedia communication devices that can provide not only basic voice communication services but also various data transmission and supplementary services. Recent advances in a 3 Dimensional (3D) stereoscopic imaging technology have given rise to development of mobile terminals capable of outputting 3D stereoscopic images.

A 3D stereoscopic image includes a sequence of alternating left frames (L-frames) and right frames (R-frames). An L-frame and R-frame may be one of a key frame (I-frame) and a delta frame (P-frame).

During playback of a stereoscopic image, a mobile terminal outputs a sequence of L-frames and R-frames. When the user changes the playback position of the stereoscopic image, the mobile terminal starts decoding from an I-frame corresponding to the changed playback position. When the I-frame is an L-frame, the mobile terminal may create a desired stereoscopic effect by resuming playback of the stereoscopic image. However, when the I-frame is an R-frame, the mobile terminal may generate a reversed stereoscopic effect.

FIG. 1 illustrates an image with a desired stereoscopic effect and an image with a reversed stereoscopic effect according to the related art.

Referring to FIG. 1, a reference symbol [a] indicates an image with a desired stereoscopic effect, and a reference symbol [b] indicates an image with a reversed stereoscopic effect. As indicated by reference symbol [a], a sequence of an L-frame and an R-frame creates a desired stereoscopic effect, in which hearts 10 and 11 are seen as concave and a cross 12 is seen as convex. On the other hand, as indicated by reference symbol [b], a sequence of an R-frame and an L-frame creates a reversed stereoscopic effect, in which the hearts 10 and 11 are seen as convex and the cross 12 is seen as concave. In this case, content-specific stereoscopic effects may not be delivered to the user of a mobile terminal.

Therefore, a need exists for a method and an apparatus to output a stereoscopic image such that the stereoscopic effect intended by the content author is fully conveyed by a mobile terminal.

SUMMARY OF THE INVENTION

An aspect of the present invention is to address the above-mentioned problems and/or disadvantages and to provide at least the advantages described below. Accordingly, an aspect of the present invention is to provide a method and an apparatus to output a stereoscopic image such that the stereoscopic effect intended by the content author is fully conveyed by a mobile terminal.

In accordance with an aspect of the present invention, a method for outputting stereoscopic images in a mobile terminal is provided. The method includes entering a play control command for a stereoscopic video, searching for an I-frame (key frame) corresponding to a changed play position, determining, after decoding the found I-frame, whether the decoded I-frame is a left frame (L-frame) or a right frame (R-frame), adjusting, when the decoded I-frame is an R-frame, L-R sequencing, and outputting a stereoscopic image based on the adjusted L-R sequence.

In accordance with another aspect of the present invention, a method for determining whether one frame is an L-frame or an R-frame in a stereoscopic video including multiple frames is provided. The method includes extracting frame information from a selected frame of the stereoscopic video, determining, when the extracted frame information is a frame number in the frame sequence, whether the frame number is odd or even, and determining that the selected frame is an L-frame when the frame number is odd, and determining that the selected frame is an R-frame when the frame number is even.

In an exemplary implementation, the method may further include calculating, when the extracted frame information is a time stamp indicating play time, a sequence number of the selected frame from the initial frame having a sequence number of 1 based on frames-per-second information and the time stamp, determining whether the calculated sequence number is odd or even, and determining, when the sequence number is odd, that the selected frame is an L-frame, and determining, when the sequence number is even, that the selected frame is an R-frame.

In accordance with another aspect of the present invention, a mobile terminal capable of outputting stereoscopic images is provided. The method includes a display unit for outputting stereoscopic images, an input unit for receiving a play control command for a stereoscopic video from a user, a video decoder for searching for an I-frame (key frame) corresponding to a changed play position and for decoding the found I-frame, an L-R frame determiner for determining whether the decoded I-frame is a left frame (L-frame) or a right frame (R-frame), and an image output controller for adjusting, when the decoded I-frame is an R-frame, L-R sequencing and for controlling the display unit to output a stereoscopic image based on the adjusted L-R sequence.

In a feature of the present invention, a mobile terminal may output a stereoscopic image in a manner that the stereoscopic effect intended by the content author is fully conveyed by the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention focus on a mobile terminal. However, exemplary embodiments of the present invention are not limited thereto, and are applicable to any device capable of outputting stereoscopic images. The mobile terminal of the present invention may include a mobile communication terminal, a Portable Multimedia Player (PMP), a Personal Digital Assistant (PDA), a smart phone, or an MP3 player. Here, the mobile communication terminal may include an International Mobile Telecommunications 2000 (IMT 2000) terminal, Wideband Code Division Multiple Access (WCDMA) terminal, Global System for Mobile communications (GSM)/General Packet Radio Services (GPRS) terminal, or Universal Mobile Telecommunications System (UMTS) terminal.

In exemplary embodiments of the present invention, an "I-frame" is a key frame acting as a reference among multiple frames in video data. A video decoder starts decoding from an I-frame. A "P-frame" is a delta frame containing only information regarding changes from a preceding frame. During frame decoding, the video decoder decodes an I-frame first and then decodes a P-frame.

Figure 1:
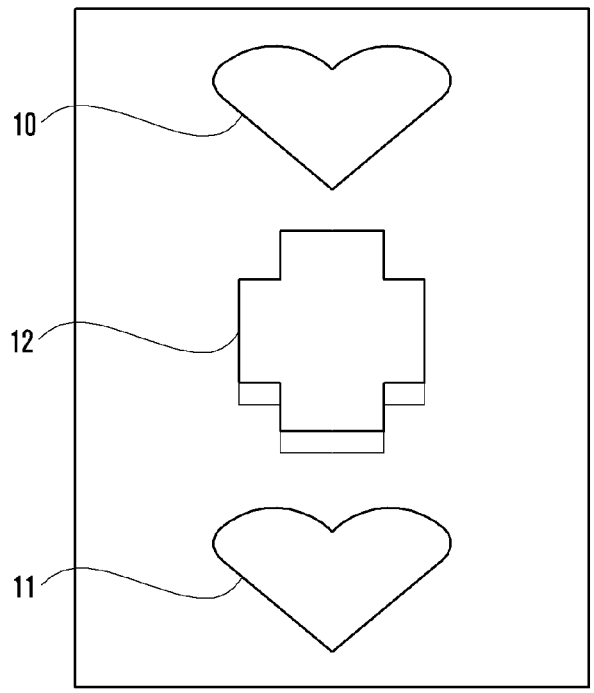
FIG. 1 illustrates an image with a desired stereoscopic effect and an image with a reversed stereoscopic effect according to the related art.
Figure 1:
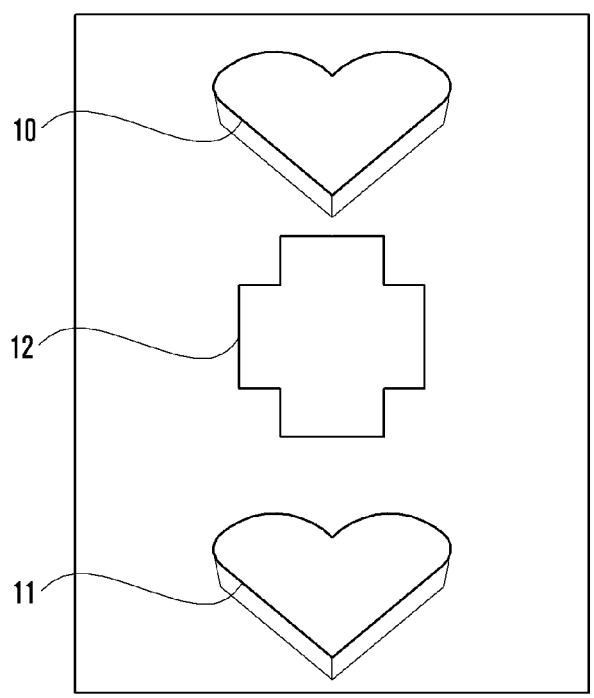
Figure 2:
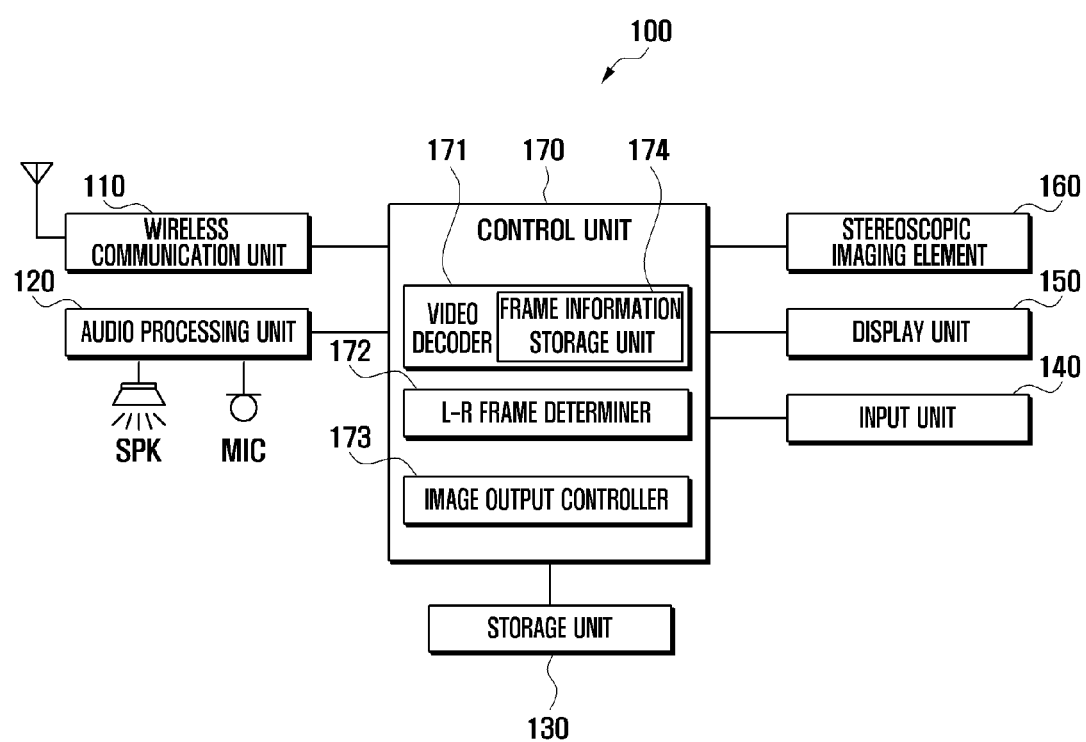
FIG. 2 is a block diagram of a mobile terminal capable of outputting stereoscopic images according to an exemplary embodiment of the present invention.
Figure 3:
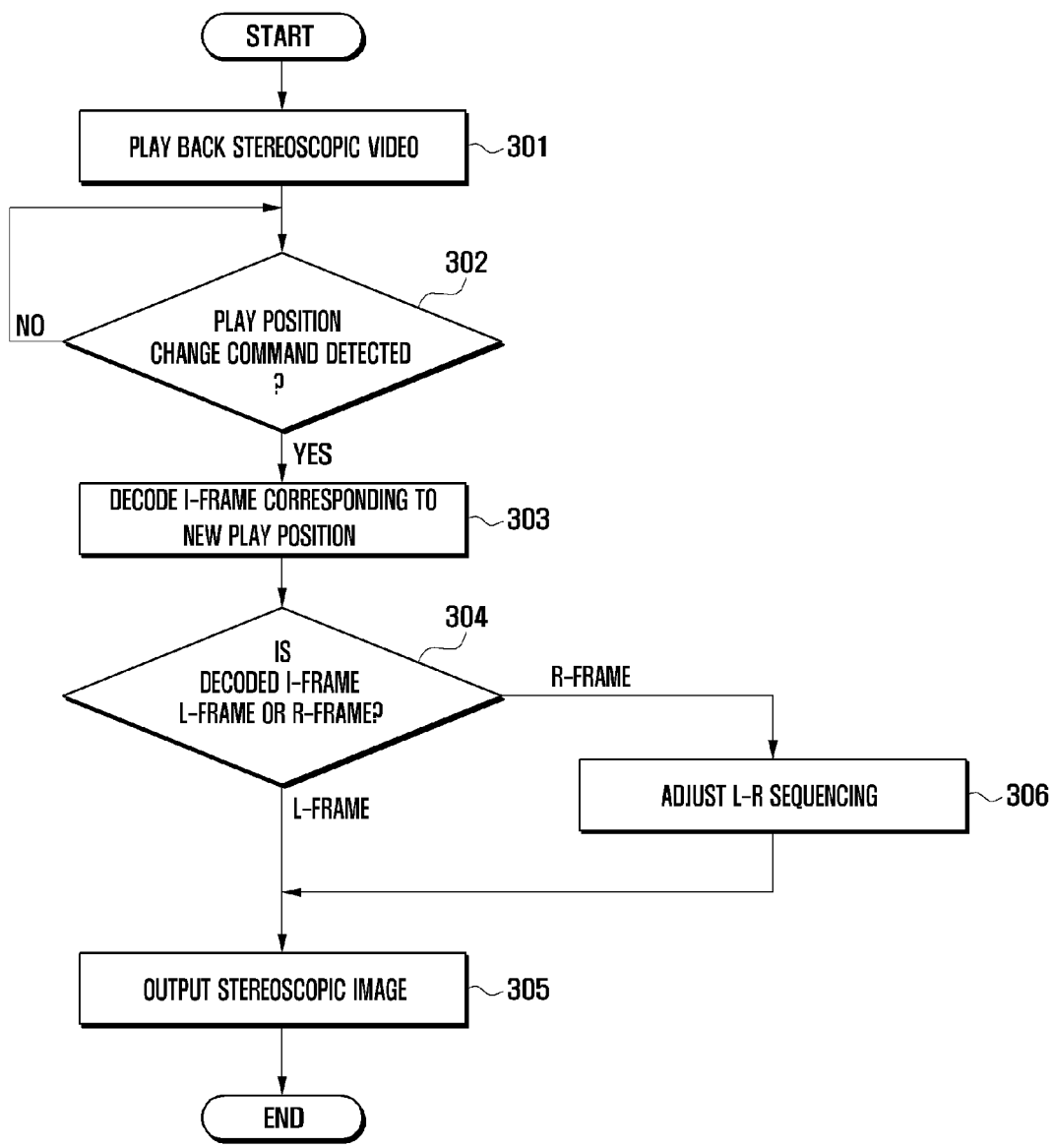
FIG. 3 is a flowchart of a method for outputting a stereoscopic image in a mobile terminal according to an exemplary embodiment of the present invention.
Figure 4:
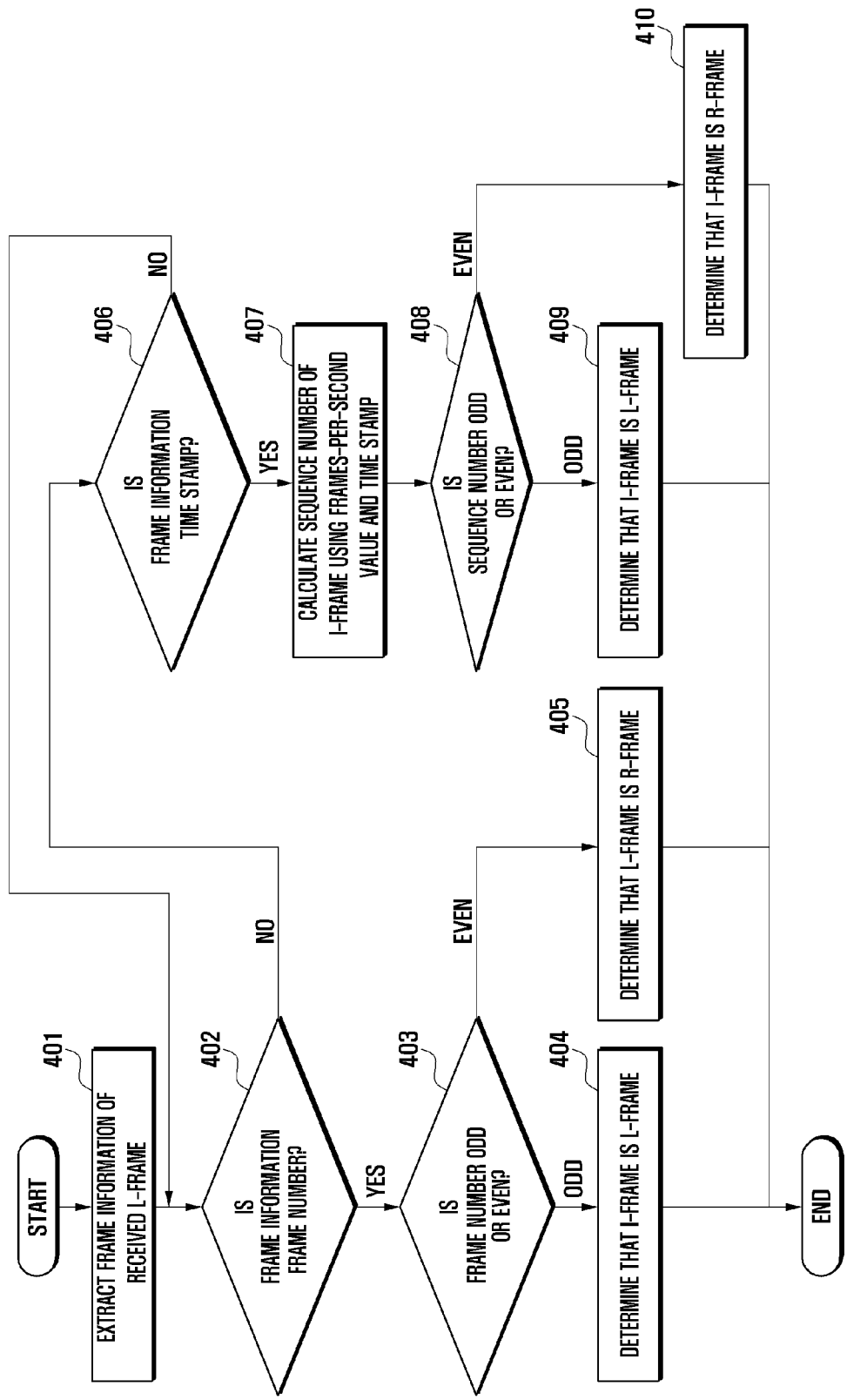
FIG. 4 is a flowchart of a frame determining step according to an exemplary embodiment of the present invention.

FIGS. 2 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 2 is a block diagram of a mobile terminal capable of outputting stereoscopic images according to an exemplary embodiment of the present invention.

Referring to FIG. 2, a mobile terminal 100 includes a wireless communication unit 110, an audio processing unit 120, a storage unit 130, an input unit 140, a display unit 150, a stereoscopic imaging element 160, and a control unit 170.

The wireless communication unit 110 sends and receives data for wireless communication of the mobile terminal 100. The wireless communication unit 110 may include a radio frequency transmitter for upconverting the frequency of a signal to be transmitted and amplifying the signal, and a radio frequency receiver for low-noise amplifying a received signal and downconverting the frequency of the signal. The wireless communication unit 110 may receive data through a wireless channel and forward the received data to the control unit 170, and may transmit data from the control unit 170 through the wireless channel. More particularly, the wireless communication unit 110 may receive stereoscopic image data from an external server or another mobile terminal.

The audio processing unit 120 may include a coder/decoder (codec). The codec may include a data codec for processing packet data, and an audio codec for processing an audio signal, such as a voice signal. The audio processing unit 120 converts a digital audio signal into an analog audio signal through the audio codec and outputs the analog audio signal to a receiver (RCV) or a speaker (SPK), and also converts an analog audio signal from a microphone (MIC) into a digital audio signal through the audio codec.

The storage unit 130 stores programs and data necessary for the operation of the mobile terminal 100, and may include a program area and a data area. The storage unit 130 may include volatile storage media, non-volatile storage media, or a combination thereof. The volatile storage media may include semiconductor memories, such as a Random Access Memory (RAM), a Dynamic Random Access Memory (DRAM), and a Static Random Access Memory (SRAM), and the non-volatile storage media may include a hard disk. More particularly, the storage unit 130 stores stereoscopic image data, which may be in a coded form with a specific format or in a decoded form.

The input unit 140 generates a key signal corresponding to user manipulation and sends the key signal to the control unit 170. The input unit 140 may include a keypad having alphanumeric and direction keys arranged in a 3*4, a QWERTY layout, or a touch panel. The input unit 140 may further include a button key, a jog key and a wheel key. The input unit 140 generates an input signal for executing a function of the mobile terminal 100 (such as call handling, playback of moving images or music, image display, or image capturing with a camera) according to a user action, and sends the input signal to the control unit 170. More particularly in connection with a stereoscopic video, the user may enter a command, such as play, fast forward, rewind or play position selection.

The display unit 150 may be realized using Liquid Crystal Display (LCD) devices, organic Light Emitting Diodes (OLED), or Active Matrix Organic Light Emitting Diodes (AMOLED). The display unit 150 visually provides various information, such as menus, input data, and function-setting data, to the user. The display unit 150 may output a boot screen, an idle screen, a call handling screen, and other application screens for the mobile terminal 100. More particularly, the display unit 150 outputs video frames decoded by a video decoder 171 of the control unit 170 under the control of an image output controller 173.

The stereoscopic imaging element 160 is placed in front of the display unit 150 so that different images may be presented to the left eye and right eye of the viewer. More particularly, the stereoscopic imaging element 160 may be a lenticular lens or a parallax barrier. A lenticular lens consists of cylindrical lenticules. When left and right images in the form of a stripe are placed at the focal plane of the lenticular lens, the left and right images are separated according to directions of the lenticules. Hence, the user may view a stereoscopic image without wearing glasses. The width of a lenticule is determined by the width of a pixel in the display, and a single lenticule may be associated with two pixels of the left and right images. To separate the left and right images, the lenticule functions such that the pixel to the left thereof can be seen only by the right eye, and the pixel to the right thereof can be seen only by the left eye.

A parallax barrier consists of slits that block or pass light and are spaced at regular intervals. The left and right images are interlaced in columns on the display and the parallax barrier is positioned so that left and right image pixels can be seen only from particular view points. Hence, the user may experience a stereoscopic effect.

The control unit 170 controls the overall operation of the mobile terminal 100 and controls signal exchange between the internal components thereof. More particularly, the control unit 170 includes a video decoder 171, an L-R frame determiner 172, and an image output controller 173.

The video decoder 171 reads stereoscopic image data from the storage unit 130 and decodes frames constituting the stereoscopic image data. The video decoder 171 may include a frame information storage unit 174 to store frame information of the stereoscopic image data read from the storage unit 130. The frame information is information used to identify individual frames, such as frame numbers and time stamps. The frame information may be recorded in the header of each frame.

After decoding a frame, the video decoder 171 forwards the decoded frame to the L-R frame determiner 172 or the image output controller 173. When the user enters a play position change command, the video decoder 171 decodes an I-frame corresponding to the new play position and subsequent frames, and sends the first decoded I-frame to the L-R frame determiner 172 and sends the subsequent decoded frames to the image output controller 173.

After a play position change command is entered, the L-R frame determiner 172 determines whether the first I-frame from the video decoder 171 is an L-frame or an R-frame. That is, when an I-frame is received from the video decoder 171, the L-R frame determiner 172 extracts frame information of the received I-frame from the frame information storage unit 174. The L-R frame determiner 172 determines whether the received I-frame is an L-frame or an R-frame based on the extracted frame information, and sends the received I-frame together with the determination result to the image output controller 173.

The image output controller 173 controls the display unit 150 to output frames from the video decoder 171 or the L-R frame determiner 172. The image output controller 173 receives an I-frame and information indicating whether the received I-frame is an L-frame or an R-frame from the L-R frame determiner 172, and controls, when the information indicates that the received I-frame is an L-frame, the display unit 150 to immediately output the received I-frame. Here, the image output controller 173 combines the I-frame with the matching R-frame and controls the display unit 150 to output the combined frame. The matching R-frame may be an I-frame or a P-frame depending upon the key frame interval. When the I-frame received from the L-R frame determiner 172 is an R-frame, the image output controller 173 performs L-R sequencing. That is, the image output controller 173 does not immediately output the received I-frame, but rather waits for the matching L-frame in the L-R sequence from the video decoder 171. When the matching L-frame is received, the image output controller 173 combines the I-frame (R-frame) from the L-R frame determiner 172 with the matching L-frame from the video decoder 171 and controls the display unit 150 to output the combined frame. The matching L-frame may be an I-frame or a P-frame depending upon the key frame interval.

In an exemplary embodiment of the present invention, the mobile terminal 100 may further include a Digital Multimedia Broadcasting (DMB) receiver (not shown). The control unit 170 may control the DMB receiver to receive a DMB signal carrying stereoscopic image data, control the video decoder 171 to decode the stereoscopic image data coded in a specified format, and deliver the decoded stereoscopic image data to the image output controller 173, which controls the display unit 150 to output the decoded stereoscopic image data.

Hereinabove, a description is given of the components of the mobile terminal 100 capable of outputting stereoscopic images. Next, a description is given of a method for outputting a stereoscopic image.

FIG. 3 is a flowchart of a method for outputting a stereoscopic image in a mobile terminal according to an exemplary embodiment of the present invention.

Referring to FIG. 3, a control unit 170 of the mobile terminal 100 controls the display unit 150 to play back a stereoscopic video in step 301. When stereoscopic video data is stored in a coded form in the storage unit 130, the video decoder 171 of the control unit 170 reads the stereoscopic video data and decodes individual frames constituting the stereoscopic video data. The video decoder 171 forwards decoded frames to the image output controller 173, which then controls the display unit 150 to output the decoded frames as a stereoscopic image.

It is possible for the mobile terminal 100 to receive stereoscopic video data carried by a radio signal or a DMB signal. In this case, the control unit 170 controls the wireless communication unit 110 or the DMB receiver (not shown) to receive stereoscopic video data and forwards the received stereoscopic video data to the video decoder 171. The video decoder 171 decodes individual frames constituting the stereoscopic video data and forwards the decoded frames to the image output controller 173, which then controls the display unit 150 to output the decoded frames as a stereoscopic image.

In step 302, during playback of the stereoscopic video, the control unit 170 controls the input unit 140 to detect a play position change command entered by the user. When the input unit 140 includes a "fast-forward" key and a "rewind" key, the control unit 170 may recognize a play position change command by determining whether entering of the fast-forward key or the rewind key is followed by entering of the "play" key. When the mobile terminal 100 is touch capable, the control unit 170 may control the display unit 150 to display a progress bar indicating the progress of playback. The control unit 170 may recognize a play position change command by determining whether a specified point on the progress bar is touched on the input unit 140 (for example, a touch sensor).

If it is determined in step 302 that a play position change command input by the user is detected, the video decoder 171 of the control unit 170 starts to decode an I-frame corresponding to the new play position in step 303. When an I-frame is present at the new play position, the video decoder 171 starts decoding from the I-frame. When a P-frame is present at the new play position, the video decoder 171 starts decoding from an I-frame closest to the P-frame. As the video decoder 171 cannot start decoding from a P-frame, it searches for an I-frame closest to the P-frame and starts decoding from the found I-frame.

After decoding the I-frame, the video decoder 171 forwards the decoded I-frame to the L-R frame determiner 172. The L-R frame determiner 172 determines whether the I-frame from the video decoder 171 is an L-frame or an R-frame based on frame information stored in the frame information storage unit 174 in step 304. Step 304 is further described with reference to FIG. 4.

In step 304, when the I-frame from the video decoder 171 is an L-frame, the L-R frame determiner 172 sends the I-frame together with the determination result indicating an L-frame to the image output controller 173. If it is determined in step 304 that the I-frame from the L-R frame determiner 172 is an L-frame, the image output controller 173 controls the display unit 150 to output a stereoscopic image in step 305. Here, the image output controller 173 combines the L-frame with the matching R-frame and controls the display unit 150 to output the combined frame.

In step 304, when the I-frame from the video decoder 171 is an R-frame, the L-R frame determiner 172 sends the I-frame together with the determination result indicating an R-frame to the image output controller 173. In contrast, if it is determined in step 304 that the I-frame from the L-R frame determiner 172 is an R-frame, the image output controller 173 performs L-R sequencing in step 306.

In step 306, the image output controller 173 does not immediately output the received I-frame, but rather waits for the matching L-frame in the L-R sequence from the video decoder 171. When the matching L-frame is received, the image output controller 173 sets the L-frame as the first frame.

The image output controller 173 controls the display unit 150 to output a stereoscopic image in step 305. The image output controller 173 combines the L-frame and the matching R-frame and controls the display unit 150 to output the combined frame.

When a command for playing back a stereoscopic video is entered by the user, the video decoder 171 of the control unit 170 may search for an I-frame corresponding to the play position and decode the found I-frame. The video decoder 171 sends the decoded I-frame to the L-R frame determiner 172, which then carries out steps 304 through 306.

Accordingly, when the user enters a play position change command, even though the I-frame corresponding to the new play position is an R-frame, the mobile terminal 100 can maintain a correct L-R sequence, preventing generation of a reversed stereoscopic effect.

FIG. 4 is a flowchart of a frame determining step according to an exemplary embodiment of the present invention. All steps in FIG. 4 may be performed by the L-R frame determiner 172.

Referring to FIG. 4, when an I-frame is received from the video decoder 171, the L-R frame determiner 172 extracts frame information of the received I-frame from the frame information storage unit 174 in step 401. The frame information may be a frame number or a time stamp. A frame number is a number assigned to a particular frame in order of playback sequence. For example, when a video includes "n" frames, frame numbers may be set to 1 to "n". A time stamp is play time information given to a specific frame.

For stereoscopic video data in an Audio Video Interleaved (AVI) format, a frame number may be assigned to each frame, and frame numbers of individual frames are stored in the frame information storage unit 174. For stereoscopic video data in a Moving Picture Expert Group-4 (MPEG-4) or (MP4) format, a time stamp is assigned to each frame, and time stamps of individual frames are stored in the frame information storage unit 174.

After extraction of the frame information, the L-R frame determiner 172 determines whether the frame information is a frame number in step 402. If it is determined in step 402 that the frame information is a frame number, the L-R frame determiner 172 determines whether the frame number is odd or even in step 403. If it is determined in step 403 that the frame number is odd, the L-R frame determiner 172 determines that the received I-frame is an L-frame in step 404. As a stereoscopic video includes a sequence of alternating L-frames and R-frames, an odd-numbered frame corresponds to an L-frame.

In contrast, if it is determined in step 403 that the frame number is even, the L-R frame determiner 172 determines that the received I-frame is an R-frame in step 405. As a stereoscopic video includes a sequence of alternating L-frames and R-frames, an even-numbered frame corresponds to an R-frame. After determining whether the frame number is odd or even, the L-R frame determiner 172 sends the received I-frame together with the determination result to the image output controller 173.

In contrast, if it is determined in step 402 that the frame information is not a frame number, the L-R frame determiner 172 determines whether the frame information is a time stamp in step 406. If it is determined in step 406 that the frame information is a time stamp, the L-R frame determiner 172 calculates the sequence number of the received I-frame from the initial frame (whose sequence number is 1) using the Frames-Per-Second (FPS) value and the time stamp in step 407. That is, the time between frames is given by the reciprocal of the FPS value, and multiplying the time between frames by the time stamp gives the sequence number of the received I-frame.

Thereafter, in step 408, the L-R frame determiner 172 determines whether the calculated sequence number is odd or even. If it is determined in step 408 that the sequence number is odd, the L-R frame determiner 172 determines that the received I-frame is an L-frame in step 409. In contrast, if it is determined in step 408 that the sequence number is even, the L-R frame determiner 172 determines that the received I-frame is an R-frame in step 410. After determining whether the frame number is odd or even, the L-R frame determiner 172 sends the received I-frame together with the determination result to the image output controller 173.

In the above description, the AVI and MP4 formats are illustrated. However, exemplary embodiments of the present invention are not limited thereto and are applicable to any stereoscopic video format employing frame numbers or time stamps.

According to an exemplary embodiment of the present invention, when the user enters a play position change command during playback of a stereoscopic video, even though the I-frame corresponding to the new play position is an R-frame, a matching L-frame is output first and the correct L-R sequence is maintained, thereby preventing a reversed stereoscopic effect.

When the mobile terminal 100 plays back a stereoscopic video that is coded in pairs of an L-frame and an R-frame, it can maintain the correct L-R sequence.

The method for outputting stereoscopic images in exemplary embodiments of the present invention may be implemented as computer programs and may be stored in various computer readable storage media. The computer readable storage media may store program instructions, data files, data structures and combinations thereof. The program instructions may include instructions developed specifically for exemplary embodiments of the present invention and existing general-purpose instructions.

The computer readable storage media may include magnetic media, such as a hard disk and a floppy disk, optical media, such as a Compact Disk-Read Only Memory (CD-ROM) and a Digital Video Disc (DVD), magneto-optical media, such as a floptical disk, and memory devices, such as a ROM and a RAM. The program instructions may include machine codes produced by compilers and high-level language codes executable through interpreters.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for outputting stereoscopic images in a mobile terminal, the method comprising:
    entering a play control command changing a play position for a stereoscopic video;
    searching for an I-frame (key frame) corresponding to the changed play position;
    determining, after decoding the searched I-frame, whether the decoded I-frame is a left frame (L-frame) or a right frame (R-frame);
    adjusting, when the decoded I-frame is an R-frame, an L-R sequence by receiving an L-frame in the L-R sequence and then combining the I-frame and the received L-frame; and
    outputting, based on the adjusted L-R sequence, a stereoscopic image based on the adjusted L-R sequence,
    wherein the searching for the I-frame comprises:
        determining whether a frame corresponding to the changed play position is an I-frame or a P-frame (delta frame); and
        finding, when the frame corresponding to the changed play position is a P-frame, an I-frame closest to the found P-frame.

2. The method of claim 1, wherein the entering of the play control command comprises entering at least one of a "play" command, a "fast forward" command followed by a "play" command, a "rewind" command followed by a "play" command, and a play position selection command.

3. The method of claim 1, wherein the determining of whether the decoded I-frame is an L-frame or an R-frame comprises:
    decoding the searched I-frame;
    extracting frame information from the decoded I-frame;
    determining, when the extracted frame information is a frame number, whether the frame number is odd or even; and
    determining, when the frame number is odd, that the decoded I-frame is an L-frame, and determining when the frame number is even, that the decoded I-frame is an R-frame.

4. The method of claim 1, wherein the determining of whether the decoded I-frame is an L-frame or an R-frame comprises:
    decoding the searched I-frame;
    extracting frame information from the decoded I-frame;
    calculating, when the extracted frame information is a time stamp indicating play time, a sequence number of the decoded I-frame from the initial frame having a sequence number of 1 based on frames-per-second information and the time stamp;
    determining whether the calculated sequence number is odd or even; and
    determining, when the sequence number is odd, that the decoded I-frame is an L-frame, and determining, when the sequence number is even, that the decoded I-frame is an R-frame.

5. The method of claim 4, wherein the frame information is recorded in the header of each frame.

6. The method of claim 1, wherein the adjusting of the L-R sequence comprises
    specifying that the received L-frame is to be output first.

7. The method of claim 6, wherein the outputting of the stereoscopic image comprises:
    combining the received L-frame and R-frame; and
    outputting the combined frames as a single frame.

8. The method of claim 1, wherein a stereoscopic imaging element is placed in front of a display unit to present different images to the left eye and the right eye of a viewer.

9. The method of claim 8, wherein the stereoscopic imaging element comprises at least one of a lenticular lens and a parallax barrier.

10. A mobile terminal capable of outputting stereoscopic images, the mobile terminal comprising:
    a display for outputting stereoscopic images;
    an input for receiving a play control command for a stereoscopic video from a user;
    a controller configured to implement a video decoder for searching for an I-frame (key frame) corresponding to a changed play position and for decoding the searched I-frame;, an L-R frame determiner for determining whether the decoded I-frame is a left frame (L-frame) or a right frame (R-frame);, and an image output controller for adjusting, when the decoded I-frame is an R-frame, a L-R sequence and for controlling the display unit to output a stereoscopic image based on the adjusted L-R sequence,
    wherein the video decoder determines whether a frame corresponding to the changed play position is an I-frame or a P-frame (delta frame), and finds, when the frame corresponding to the changed play position is a P-frame, an I-frame closest to the found P-frame.

11. The mobile terminal of claim 10, wherein the L-R frame determiner extracts frame information from the decoded I-frame, determines, when the extracted frame information is a frame number, whether the frame number is odd or even, determines that the decoded I-frame is an L-frame when the frame number is odd, and determines that the decoded I-frame is an R-frame when the frame number is even.

12. The mobile terminal of claim 10, wherein the L-R frame determiner extracts frame information from the decoded I-frame, calculates, when the extracted frame information is a time stamp indicating play time, a sequence number of the decoded I-frame from the initial frame having a sequence number of 1 based on frames-per-second information and the time stamp, determines whether the calculated sequence number is odd or even, determines that the decoded I-frame is an L-frame when the sequence number is odd, and determines that the decoded I-frame is an R-frame when the sequence number is even.

13. The mobile terminal of claim 10, wherein the image output controller waits for, when the decoded I-frame is an R-frame, a matching L-frame, specifies that the matching L-frame is to be output first, combines the matching L-frame and R-frame, and outputs the combined frames as a single frame.

14. The mobile terminal of claim 10, wherein a stereoscopic imaging element is placed in front of the display unit to present different images to the left eye and the right eye of a viewer.

15. The mobile terminal of claim 14, wherein the stereoscopic imaging element comprises at least one of a lenticular lens and a parallax barrier.

16. The mobile terminal of claim 10, wherein the frame information is recorded in the header of each frame.

* * * * *